(12) United States Patent
Ozturk et al.

(10) Patent No.: US 7,995,304 B2
(45) Date of Patent: Aug. 9, 2011

(54) CIRCUITS THAT USE A POSTAMBLE SIGNAL TO DETERMINE PHASE AND FREQUENCY ERRORS IN THE ACQUISITION OF A PREAMBLE SIGNAL

(75) Inventors: Mustafa Can Ozturk, Bloomington, MN (US); Puskal Prasad Pokharel, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 100 days.

(21) Appl. No.: 12/472,782

(22) Filed: May 27, 2009

(65) Prior Publication Data

US 2010/0302676 A1  Dec. 2, 2010

(51) Int. Cl.
G11B 5/596 (2006.01)
(52) U.S. Cl. .................................. 360/77.04
(58) Field of Classification Search ............... 360/77.04, 360/29, 51, 77.07, 55, 77.08; 375/260, 342, 375/235, 327
See application file for complete search history.

(56) References Cited

U.S. PATENT DOCUMENTS

| | | | |
|---|---|---|---|
| 4,549,232 A | 10/1985 | Axmear et al. | |
| 4,587,579 A | 5/1986 | Cocke et al. | |
| 4,912,576 A | 3/1990 | Janz | |
| 5,615,065 A | 3/1997 | Cheung | |
| 5,838,512 A * | 11/1998 | Okazaki | 360/51 |
| 6,195,220 B1 | 2/2001 | Ellis et al. | |
| 6,324,030 B1 | 11/2001 | Cheung et al. | |
| 6,366,225 B1 * | 4/2002 | Ozdemir | 341/111 |
| 6,366,423 B1 | 4/2002 | Ahn | |
| 6,566,922 B1 * | 5/2003 | Schell et al. | 327/156 |
| 6,683,493 B1 * | 1/2004 | Fujimora et al. | 329/304 |
| 6,687,292 B1 * | 2/2004 | Garcia | 375/235 |
| 6,775,084 B1 * | 8/2004 | Ozdemir et al. | 360/55 |
| 7,167,329 B2 | 1/2007 | Baker | |
| 7,167,535 B2 * | 1/2007 | Sachse et al. | 375/375 |
| 7,194,046 B2 * | 3/2007 | Borowski et al. | 375/327 |
| 7,209,314 B2 | 4/2007 | Bandic et al. | |
| 7,298,579 B2 * | 11/2007 | Asakura et al. | 360/77.08 |
| 7,298,580 B2 * | 11/2007 | Asakura et al. | 360/77.08 |
| 7,298,582 B2 * | 11/2007 | Asakura et al. | 360/77.08 |
| 7,336,737 B2 * | 2/2008 | Nakahara et al. | 375/342 |
| 7,813,065 B2 * | 10/2010 | Annampedu et al. | 360/29 |
| 2007/0160158 A1 * | 7/2007 | Zeng et al. | 375/260 |
| 2008/0118010 A1 * | 5/2008 | Nakahara et al. | 375/342 |
| 2010/0053800 A1 * | 3/2010 | Ozturk et al. | 360/77.07 |
| 2010/0128386 A1 * | 5/2010 | Keizer et al. | 360/77.07 |

* cited by examiner

Primary Examiner — Fred Tzeng
(74) Attorney, Agent, or Firm — David K. Lucente; Brandon Katterheinrich

(57) ABSTRACT

In a servo control loop, phase detection between a clock signal and servo burst fields on a movable storage media is carried out with compensation for phase error and frequency error in the timing of servo burst fields.

20 Claims, 5 Drawing Sheets

CIRCUITS THAT USE A POSTAMBLE SIGNAL TO DETERMINE PHASE AND FREQUENCY ERRORS IN THE ACQUISITION OF A PREAMBLE SIGNAL

BACKGROUND

The present invention generally relates to controlling head movement and, more particularly, to controlling head movement responsive to a position error signal within a servo control loop.

A typical data storage disk drive includes a plurality of magnetic recording disks which are mounted to a rotatable hub of a spindle motor and rotated at a high speed. An array of read/write heads is disposed adjacent to surfaces of the disks to transfer data between the disks and a host device. The heads can be radially positioned over the disks by a rotary actuator and a closed loop servo system.

The servo system can operate in two primary modes: seeking and track following. During a seek, a selected head is moved from an initial track to a target track on the corresponding disk surface. Upon reaching the target track, the servo system enters the track following mode wherein the head is maintained over the center of the target track while data is written/read. During track following, prerecorded servo burst fields are sensed by the head and demodulated to generate a position error signal (PES), which provides an indication of the position error of the head away from a desired location along the track (e.g., the track center). The PES is then converted into an actuator control signal, which is fed back to a head actuator that positions the head.

As the areal density of magnetic disc drives increases, so does the need for more precise position control when track following, especially in the presence of vibrations which can cause repeatable and non-repeatable runout error in head positioning and variation in disk speed.

SUMMARY

In a servo control loop, phase detection between a clock signal and servo burst fields on a movable storage media is carried out with compensation for the effect of phase error and frequency error on servo burst fields.

In some embodiments, a timing circuit detects a preamble phase angle between a clock signal and a preamble signal read from a preamble pattern on a moving storage media. The timing circuit also detects at least one postamble phase angle between the clock signal and a postamble signal read from a postamble pattern following the preamble pattern on the storage media. The timing circuit then determines values for a phase acquisition error and a frequency acquisition error in the preamble phase angle in response to the postamble phase angle.

In some other embodiments, a process for detecting phase and frequency acquisition errors in a preamble pattern on a moving storage media includes detecting a preamble phase angle between a clock signal and a preamble signal read from the preamble pattern. At least one postamble phase angle is detected between the clock signal and a postamble signal read from a postamble pattern following the preamble pattern on the storage media. Values for a phase acquisition error and a frequency acquisition error in the preamble phase angle are determined in response to the postamble phase angle.

In some other embodiments, a servo controller circuit includes a timing circuit and a servo circuit. The timing circuit detects a preamble phase angle between a clock signal and a preamble signal read by a sensor from a preamble pattern on a moving storage media, detects a position signal between the clock signal and a position pattern located after the preamble pattern, and detects at least one postamble phase angle between the clock signal and a postamble signal read from a postamble pattern on the storage media. The servo circuit determines values for a phase acquisition error and a frequency acquisition error remaining after timing acquisition of the preamble phase angle in response to the postamble phase angle, determines a position phase error that represents an effect of the determined phase and frequency acquisition errors on the position signal between the clock signal and the position pattern, adjusts the position signal to compensate for the determined position phase acquisition error, and positions the sensor responsive to the adjusted position signal.

DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Figure 1:
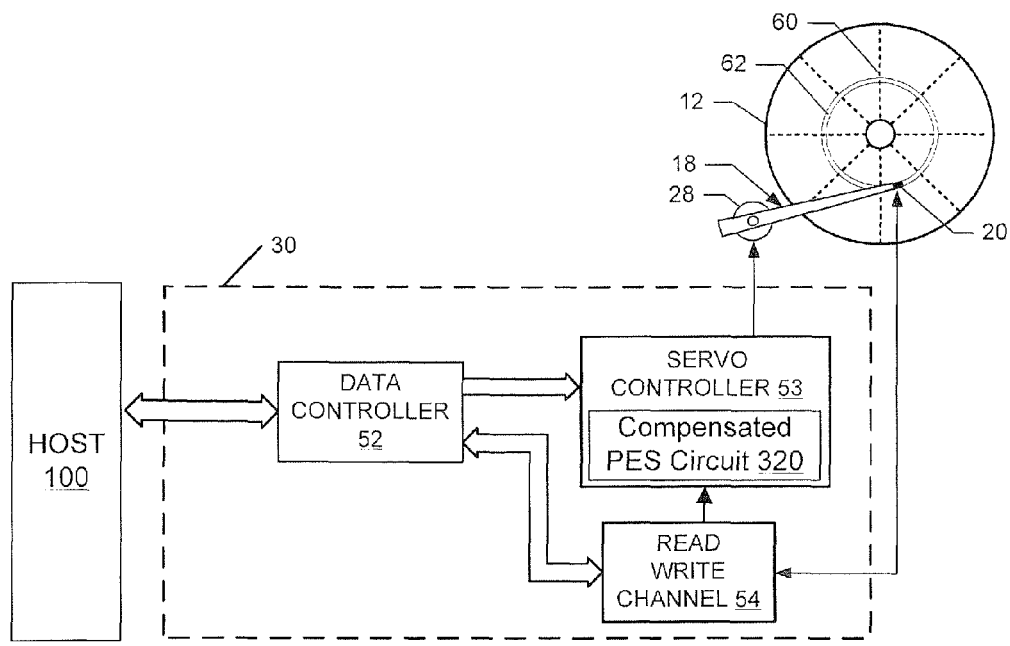
FIG. 1 is a block diagram of disk drive electronic circuits that include a servo controller that is configured in accordance with some embodiments.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

It will be understood that, although the terms first, second, etc. may be used herein to describe various elements, these elements should not be limited by these terms. These terms are only used to distinguish one element from another. For example, a first region/element/value could be termed a second region/element/value, and, similarly, a second region/element/value could be termed a first region/element/value without departing from the teachings of the disclosure.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium that is executable by a processor to perform functionality described herein. Accordingly, as used herein, the terms "circuit" and "module" may take the form of digital circuitry, such as computer-readable program code executed by a processor (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of disk drives for purposes of illustration and explanation only, the present invention is not limited thereto. It is to be understood that the present invention can be more broadly used for any type of servo control loop having processors that take turns controlling head positioning by an actuator in response to different defined ones of sequentially occurring spaced apart servo patterns on a media that is moving relative to the head.

FIG. 1 is a block diagram of disk drive electronic circuits 30 which include a data controller 52, a servo controller 53, and a read write channel 54. Although two separate controllers 52 and 53 and a read write channel 54 have been shown for purposes of illustration and discussion, it is to be understood that their functionality described herein may be integrated within a common integrated circuit package or distributed among more than one integrated circuit package. A head disk assembly can include a plurality of data storage disks 12, an actuator arm 18 with a plurality of read/write heads 20 (or other sensors) which are moved radially across different data storage surfaces of the disk(s) 12 by an actuator motor (e.g., voice coil motor) 28, and a spindle motor which rotates the disk(s) 12.

Write commands and associated data from a host device 100 are buffered by the data controller 52. The host device 100 can include, but is not limited to, a desktop computer, a laptop computer, a personal digital assistant (PDA), a digital video recorder/player, a digital music recorder/player, and/or another electronic device that can be communicatively coupled to store and retrieve data in the head disk assembly.

The data controller 52 carries out buffered write commands by formatting the associated data into blocks with the appropriate header information, and transfers the formatted data via the read/write channel 54 to logical block addresses (LBAs) on a data storage surface of the disk 12 identified by the associated write command.

The read write channel 54 can convert data between the digital signals processed by the data controller 52 and the analog signals conducted through the heads 20. The read write channel 54 provides servo data read from servo sectors 60 on the disk 12 to the servo controller 53. The servo sectors 60 may be configured in a conventional manner that is well known in the art. The servo data can be used to detect the location of a head 20 relative to LBAs on the disk 12. The servo controller 53 can use LBAs from the data controller 52 and the servo data to seek a head 20 to an addressed track 62 and block on the disk 12 (i.e., seek mode), and to maintain the head 20 aligned with the track 62 while data is written/read on the disk 12 (i.e., track following mode).

Figure 2:
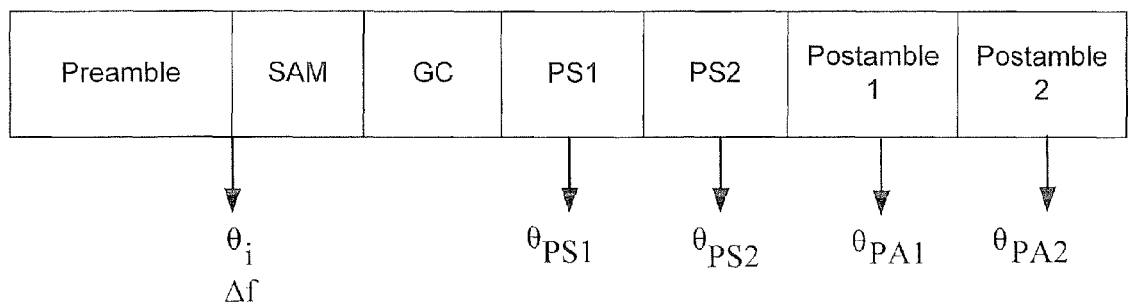
FIG. 2 illustrates at least a portion of a servo burst pattern that includes a preamble pattern and two postamble patterns in accordance with some embodiments.

FIG. 2 illustrates an embodiment of at least a part of a servo burst pattern in accordance with some embodiments that may reside in one or more of the servo sectors 60 and which may be read therefrom by the head 20 for use by the servo controller 52 to position the head 20 during track following and/or seeking operations. Referring to FIG. 2, the servo burst pattern can include a preamble pattern, a servo address Mark (SAM) pattern, a gray code (GC) pattern, a first position pattern, a second position pattern, a first postamble pattern (Postamble 1), and a second postamble pattern (Postamble 2). The servo burst pattern is not limited to the illustrated embodiment because, for example, any number of position patterns and postamble patterns may be used in accordance with various embodiments of the present invention. The postamble patterns may each be a field similar to the preamble that is written on the disk 12 with a known phase relationship to the preamble pattern. The frequency of the Postamble fields may or may not be the same as the preamble field. The position bursts can be any type of servo bursts, servo null pattern, servo phase pattern, split burst pattern, split burst amplitude or any other servo burst pattern. Some embodiments are described herein, without limitation, in the context of a NULL pattern with 2 burst fields. However, various embodiments are not limited thereto and may be applied to any servo position pattern.

As the head 20 moves through the servo burst pattern of FIG. 2 (e.g. reading from left to right), a timing circuit uses a preamble signal to acquire phase and frequency of the preamble signal and uses an Analog to digital converter (ADC) to detect bursts in a SAM signal, a GC signal, the first position signal PS1, the second position signal PS2, a first postamble signal, and a second postamble signal generated by head reading the corresponding patterns shown in FIG. 2.

However, timing acquisition errors exist due to, for example, the effects of external disturbances, disk runout (e.g., eccentric tracks), and/or spindle motor speed variation that cause variation in the associated timing of the servo burst field components of the associated readback signals. Consequently, at the end of the preamble pattern, a phase acquisition error $\theta i$ and a frequency acquisition error $\Delta f$ are typically present after timing recovery is finished at the end of the preamble.

In accordance with some embodiments, a frequency and phase compensated PES module 320, which may at least partially reside in the servo controller 53 as shown in FIG. 1, is configured to determine values for the phase acquisition error $\theta i$ and the frequency acquisition error $\Delta f$ in the preamble phase angle $\theta$. The module 320 can be further configured to use the determined phase acquisition error θi and the frequency acquisition error Δf to improve the accuracy of head position information that is generated from the first and second position patterns.

Figure 3:
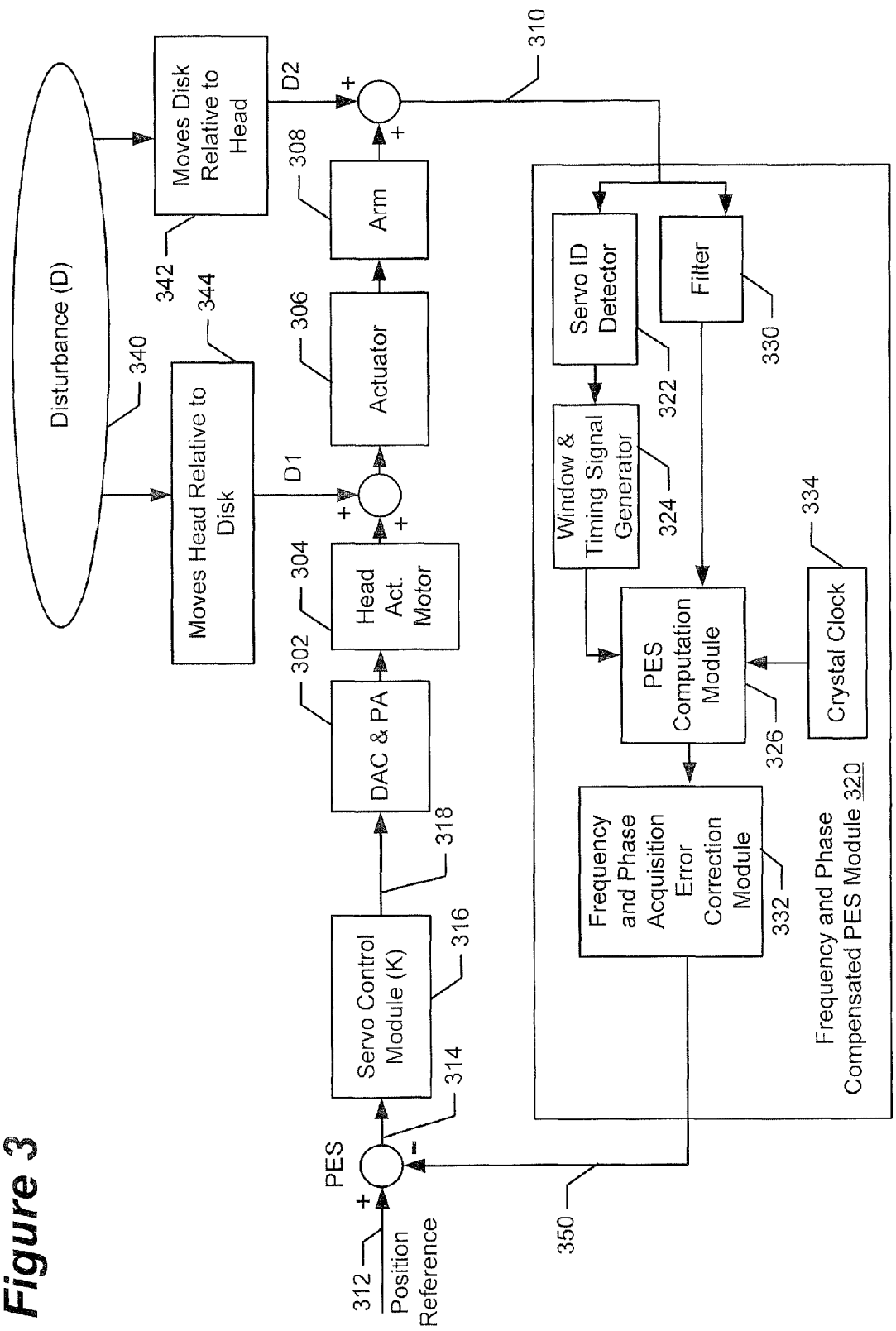
FIG. 3 is a block diagram of a servo control loop configured in a track-following mode and which can be partially embodied within the servo controller of FIG. 1 in accordance with some embodiments.

FIG. 3 is a block diagram of a servo control loop that can control positioning of the head 20 relative to the first and second position patterns during track-following and/or seeking operations. The servo control loop can be partially embodied within the servo controller 53 of FIG. 1.

Referring to FIG. 3, the head-disk assembly of the disk drive can be modeled in the servo control loop as including a digital-to-analog converter (DAC) and power amplifier 302, a head actuator motor (e.g., voice coil motor) 304, an actuator 306, and an actuator arm 308.

An illustrated disturbance 340 (D) imparts a first disturbance component 342 (e.g., vibration) that moves the head relative to a disk track, and imparts a second disturbance component 344 that moves the disk relative to the head. The second disturbance component 344 may result in, for example, disk speed variations that occur relative to the head due to disk runout (repeatable/non-repeatable runout) from eccentric disk track rotation and/or spindle motor speed variations.

The servo burst fields sensed by the head relative to a given track form components of a read signal 310 that is input to a frequency and phase acquisition compensated PES module 320. The module 320 can include a servo ID detector 322, a window and timing signal generator 324, a PES computation module 326, a filter 330, a frequency and phase acquisition error correction module 332, and a crystal (servo) clock 334. The servo ID detector 322 and the window and timing signal generator 324 trigger operation of the PES computation module 326 and the frequency compensated PES computation module 320 in response to detecting presence of the preamble and subsequent servo burst field components in the read signal 310. The read signal 310 is filtered by a filter 330 and input to the PES computation module 326 and then to a frequency and phase acquisition error correction module 332. Although various separate elements have been illustrated for the frequency and phase compensated PES module 320 for ease of explanation, it is to be understood that their functionality described herein may be combined into more or less elements.

The PES computation module 326 detects the preamble phase angle θ between the clock signal from the clock 334 and the preamble signal component of the readback signal 310, detects a first position pattern phase angle between the clock signal and the first position signal PS1, detects a second position pattern phase angle between the clock signal and the second position signal PS2, detects a first postamble phase angle $θ_{PA1}$ between the clock signal and the first postamble signal component, and detects a second postamble phase angle $θ_{PA2}$ between the clock signal and the second postamble signal component. The external disturbance 340 causes variation in the associated timing of the servo burst field components in the readback signal 310 and result in a phase acquisition error θi and a frequency acquisition error Δf at the end of the preamble pattern.

The frequency and phase acquisition error correction module 332 then uses the relative timing between the first and second postamble phase angles $θ_{PA1}$ and $θ_{PA2}$ to determine values for the phase acquisition error θi and for the frequency acquisition error Δf in the preamble phase angle θ. The module 332 can then determine the position of the head 20 relative to the first and second position patterns (PS1 and PS2) while compensating for the determined values for the phase acquisition error θi and for the frequency acquisition error Δf, which may improve the accuracy with which the head 20 is positioned relative to the servo burst patterns in the servo sectors 60.

The frequency and phase acquisition error compensated PES components are combined with a reference position 412 (desired position) for the head to generate a PES 314. The PES 314 is therefore indicative of the difference between the actual and desired positions of the head (i.e., head position error), and is provided to a servo control module 316. The servo control module 316 responds (e.g., with a transfer gain K) to the value of PES 314 to generate a servo control signal 318.

The servo control signal 318 can be converted by a DAC/power amplifier 302 into an analog signal, assuming it was a digital signal, and then amplified and provided to a head actuator motor 304. The head actuator motor 304 is connected to an actuator 306 which moves an actuator arm 308 in response to the amplified control signal supplied to the head actuator motor 304. The head is connected to the actuator arm 308 (e.g., to an end of the actuator arm 308).

In this way, the servo control loop controls the positioning of the head relative to a selected track on the disk surface during reading/writing of data along the selected track. Moreover, because the frequency and phase acquisition error compensation module 332 generates PES components that have been adjusted to at least partially remove effects of frequency and phase error on the servo burst signals in the read signal 310, the servo control loop may be able to more accurately control positioning of the head relative to a track in presence of increased data storage densities and/or disturbances.

Exemplary operations that may be carried out by the frequency and phase acquisition error correction module 332 and/or the PES computation module 326 to determine the phase acquisition error θi and the frequency acquisition error Δf and to compensate the head positioning responsive thereto are described below with regard to FIGS. 4-6. In this description, the term $N_{SAM}$ refers to the length of the servo address mark pattern SAM, the term $N_{GC}$, refers to the length of the gray code pattern GC, the term $N_{PS1}$ refers to the length of the first position pattern, the term $N_{PS2}$ refers to the length of the second position pattern, the term $N_{PA1}$ refers to the length of the first postamble pattern, and the term $N_{PA2}$ refers to the length of the second postamble pattern. The terms $S_1$ and $S_2$ respectively refer to the sine components of the first and second position patterns (PS1 and PS2), the terms $C_1$ and $C_2$ respectively refer to the cosine components of the first and second position patterns (PS1 and PS2).

When there are no errors in the timing acquired by the PES computation module 326 between the servo clock 334 and the preamble, the phase acquisition error $θ_i$ is zero and the frequency acquisition error is zero. In such a case, for a NULL servo pattern, a first position pattern phase angle error $θ_{PS1}$, a second position pattern phase angle error $θ_{PS2}$ the first postamble phase angle $θ_{PA1}$, the and second postamble phase angles $θ_{PA2}$ are all zero (assuming Postamble fields are written at the same frequency and in phase with the preamble field). Conversely, when the phase acquisition error $θ_i$ and/or the frequency acquisition error Δf are not zero, the first position pattern phase angle error $θ_{PS1}$, the second position pattern phase angle error $θ_{PS2}$ the first postamble phase angle $θ_{PA1}$ and the second postamble phase angles $θ_{PA2}$ are nonzero and can be used by the frequency and phase acquisition error correction module 332 to determine the phase acquisition error $θ_i$ and the frequency acquisition error Δf.

Figure 4:
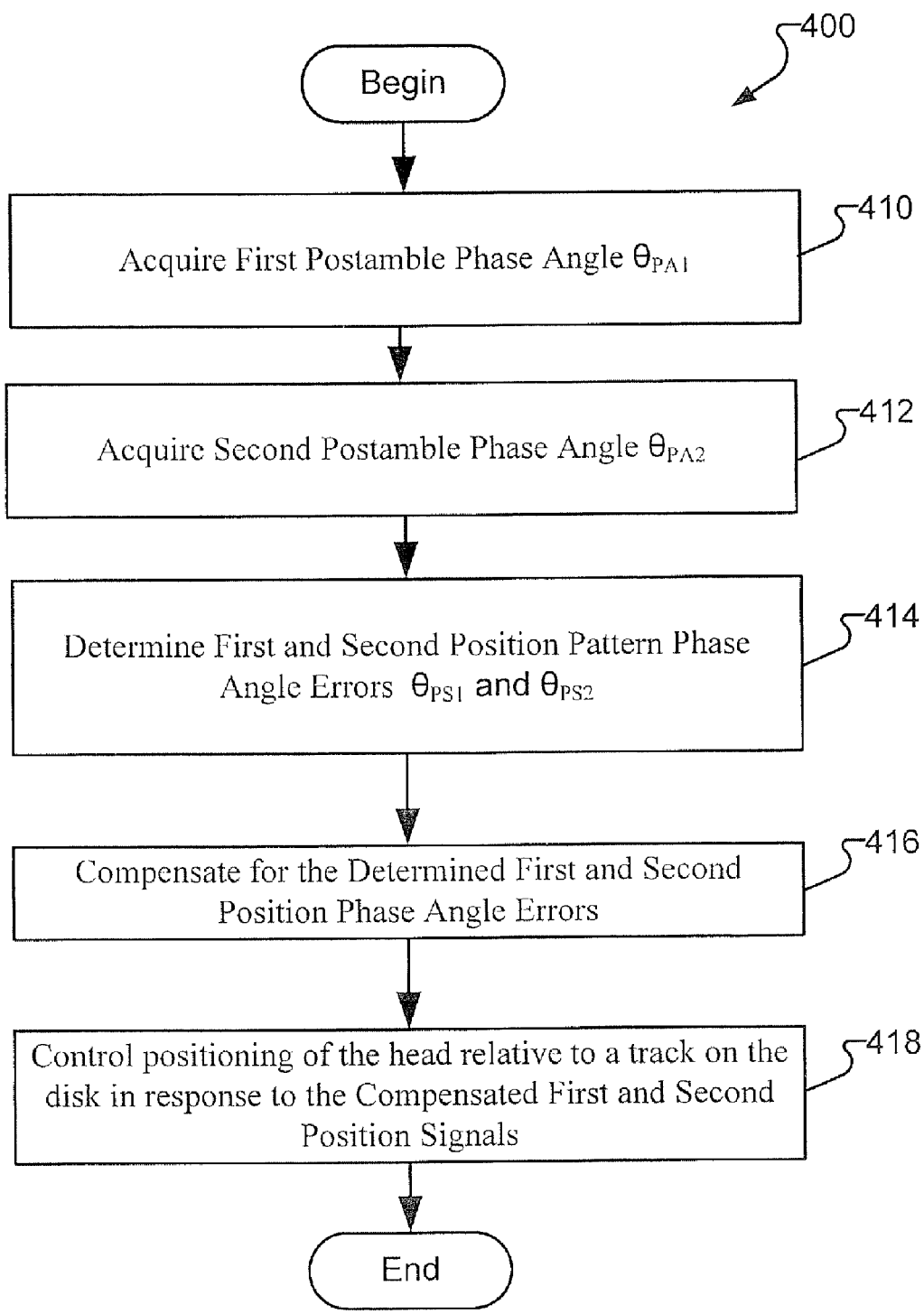
FIG. 4 is a flow chart of operations that use a postamble signal to determine and compensate for phase and frequency acquisition errors in the acquisition of a preamble signal in accordance with some embodiments.

FIG. 4 is a flowchart of exemplary operations 400 that use first and second postamble patterns to determine and compensate for phase and frequency acquisition errors in the acquisition of the preamble signal in accordance with some embodiments. The first and second postamble phase angles $\theta_{PA1}$ and $\theta_{PA2}$ are acquired (blocks 410 and 412) in response to the phase angle between the servo clock and the respective first and second postamble patterns. The first and second postamble phase angles $\theta_{PA1}$ and $\theta_{PA2}$ are used to determine (block 414) first and second position pattern phase angle errors $\theta_{PS1}$, $\theta_{PS2}$ for the position signals PS1 and PS2 acquired from the respective first and second position patterns. Once $\theta_{PS1}$, $\theta_{PS2}$ are known, the first and second position signals PS1 and PS2 can be modified (block 146) to compensate for the timing acquisition errors. The head 20 can then be positioned (block 418) relative to a track on the disk in response to the compensated first and second position signals. These and further related operations are described below. Moreover, the exemplary equations described below assume a certain ordering of the SAM, GC, PS1, PS2, PA1, and PA1. However, the equations may be adapted based on the teachings herein to process different numbers of fields and ordering of the fields. For example, the equations may be adapted to process any number of servo bursts and, therefore, are not limited to use with two servo bursts.

The first and second postamble phase angles $\theta_{PA1}$ and $\theta_{PA2}$ can depend on the phase acquisition error $\theta_i$, the frequency acquisition error $\Delta f$ in the preamble, and the number of servo clock cycles occurring in the readback signal 310 between the preamble pattern and the second postamble pattern, as represented by the following equations:

$$\theta_{PA1} = \theta_i + \Delta f(N_{SAM} + N_{GC} + N_{PS1} + N_{PS2} + N_{PA1}/2), \text{ and}$$

$$\theta_{PA2} = \theta_i + \Delta f(N_{SAM} + N_{GC} + N_{PS1} + N_{PS2} + N_{PA1} + N_{PA2}/2)$$

For these two equations, the PES computation module 326 detects the first and second postamble phase angles $\theta_{PA1}$ and $\theta_{PA2}$ and the number of servo clock cycles in the servo address mark pattern SAM, the gray code pattern GC, the first position pattern (PS1), the second position pattern (PS2), the first postamble pattern, and the second postamble pattern are each known. Accordingly, only the phase acquisition error $\theta_i$ and the frequency acquisition error $\Delta f$ are unknown in these two equations and can therefore be determined (i.e., solving two equations having two unknowns).

In particular, the frequency acquisition error $\Delta f$ in the preamble can be determined from a ratio between 1) a difference between the first and second postamble phase angles $\theta_{PA1}$ and $\theta_{PA2}$ and 2) the number of servo clock cycles occurring in the readback signal 310 between the first and second postamble patterns, as represented by the following equation:

$$\Delta f = (\theta_{PA2} - \theta_{PA1})/(N_{PA1}/2 + N_{PA2}/2).$$

The phase acquisition error $\theta_i$ in the preamble can be determined from a difference between the first postamble phase angle $\theta_{PA1}$ and a product of the frequency acquisition error $\Delta f$ and the number of servo clock cycles between the preamble and the end of the second postamble pattern, as represented by the following equation:

$$\theta_i = \theta_{PA1} - \Delta f(N_{SAM} + N_{GC} + N_{PS1} + N_{PS2} + N_{PA1}/2).$$

Using the above determined frequency acquisition error $\Delta f$ and phase acquisition error $\theta_i$ in the preamble phase angle, the frequency and phase acquisition error correction module 332 can determine a first position pattern phase angle error $\theta_{PS1}$ that represents an effect of the determined phase $\theta_i$ and frequency acquisition errors $\Delta f$ on the acquired first position pattern phase angle PS1 between the clock signal and the first position pattern, and can similarly determine a second position pattern phase angle error $\theta_{PS2}$ that represents an effect of the determined phase $\theta_i$ and frequency acquisition errors $\Delta f$ on the acquired second position pattern phase angle PS2 between the clock signal and the second position pattern. The first position pattern phase angle error $\theta_{PS1}$ can be determined based on the equation $$\theta_{PS1} = \theta_i + \Delta f(N_{SAM} + N_{GC} + N_{PS1}/2),$$

and the second position pattern phase angle error $\theta_{PS2}$ can be determined based on the equation $$\theta_{PS2} = \theta_i + \Delta f(N_{SAM} + N_{GC} + N_{PS1} + N_{PS2}/2).$$

After determining the first and second position pattern phase angle errors $\theta_{PS1}$ and $\theta_{PS2}$, the frequency and phase acquisition error correction module 332 modify the first and second position pattern phase angles (between the servo clock and PS1 and PS2) to compensate for the determined timing acquisition errors to generate corrected sine components $\tilde{S}_1$ and $\tilde{S}_2$ of the first and second position patterns phase angles (between the servo clock and PS1 and PS2), and to generate corrected cosine components $\tilde{C}_1$ and $\tilde{C}_2$ of the first and second position patterns phase angles. As explained above, these exemplary equations may be modified based on the teachings herein to compensate for other types of servo patterns, such as for servo patterns other than NULL patterns.

The frequency and phase acquisition error correction module 332 may determine the first position pattern phase error $\theta_{PS1}$ based on adding a value of the phase acquisition error $\theta_i$ to a value of the frequency acquisition error $\Delta f$ that is multiplied by a number of cycles occurring in the readback signal 310 from the head 20 reading a portion of the servo burst pattern including between the preamble pattern and the first postamble pattern, and may determine determines the second position pattern phase error $\theta_{PS2}$ based on adding a value of the phase acquisition error $\theta_i$ to a value of the frequency acquisition error $\Delta f$ that is multiplied by a number of cycles occurring in the readback signal 310 from the head 20 reading a portion of the servo burst pattern including between the preamble signal and the second postamble pattern.

It is to be understood that the servo null pattern is used for simplicity of explanation without limitation to the invention. The embodiments herein may be applied to any servo pattern.

In some embodiments, the frequency and phase acquisition error correction module 332 can determine the corrected sine $\tilde{S}_1$ and cosine $\tilde{C}_1$ components of the first position patterns phase angle based on the equation $$\begin{bmatrix} \tilde{S}_1 \\ \tilde{C}_1 \end{bmatrix} = \begin{bmatrix} \cos(-\theta_{PS1}) & -\sin(-\theta_{PS1}) \\ \sin(-\theta_{PS1}) & \cos(-\theta_{PS1}) \end{bmatrix} \begin{bmatrix} S_1 \\ C_1 \end{bmatrix},$$

and can determine the corrected sine $\tilde{S}_9$ and cosine $\tilde{C}_2$ components of the second position patterns phase angle based on the equation $$\begin{bmatrix} \tilde{S}_2 \\ \tilde{C}_2 \end{bmatrix} = \begin{bmatrix} \cos(-\theta_{PS2}) & -\sin(-\theta_{PS2}) \\ \sin(-\theta_{PS2}) & \cos(-\theta_{PS2}) \end{bmatrix} \begin{bmatrix} S_2 \\ C_2 \end{bmatrix}.$$

The servo controller 53 can then control positioning of the head 20 during track following and/or seeking in response to the corrected sine $\tilde{S}_1$, $\tilde{S}_2$ and cosine $\tilde{C}_1$, $\tilde{C}_2$ components of the first and second position pattern phase angles (between the servo clock and PS1 and PS2).

The frequency and phase acquisition error correction module 332 may combine the corrected sine $\tilde{S}_1$ and cosine $\tilde{C}_1$ components of the first position pattern PS1 to generate a first position value, similarly combine the corrected sine $\tilde{S}_2$ and cosine $\tilde{C}_2$ components of the second position pattern PS2 to generate a second position value, and generate a sensed head position value based on a ratio of the first and second position values.

The sensed head position value can be combined with a position reference signal 312 to generate a position error signal PES that can be provided to the servo control module 316. The position error signal PES is therefore indicative of the difference between the sensed and desired positions of the head (i.e., head position error). The servo control module 316 responds to the value of the position error signal PES to generate an actuator control signal that is converted by a digital-to-analog (DAC)/power amplifier 302 into an analog signal that regulates movement of the head actuator motor 304. As described above with regard to FIG. 1, the head actuator motor 304 is connected to an arm 308 that moves the head 20.

The position reference signal 312 may be a constant, such as zero, during a track following operation and may be varied through a range of values over time according to a defined profile to provide a desired seek profile during a seek operation.

FIGS. 5-8 illustrate graphs of the simulated operation of a servo control loop that may operate in accordance with some embodiments while being subjected to a range of frequency acquisition offset errors and different defined phase acquisition errors. For the simulated operation, it was assumed that the servo burst pattern included NULL patterns for the first and second position patterns where the frequency of the preamble, position bursts and the Postamble are the same. It is noted that the embodiments are not limited to this particular servo burst pattern configuration because, for example, the operations may have been carried out with a burst signal at a different frequency than the preamble frequency, or, the servo pattern may have been a servo phase pattern or any other servo pattern.

Figure 5:
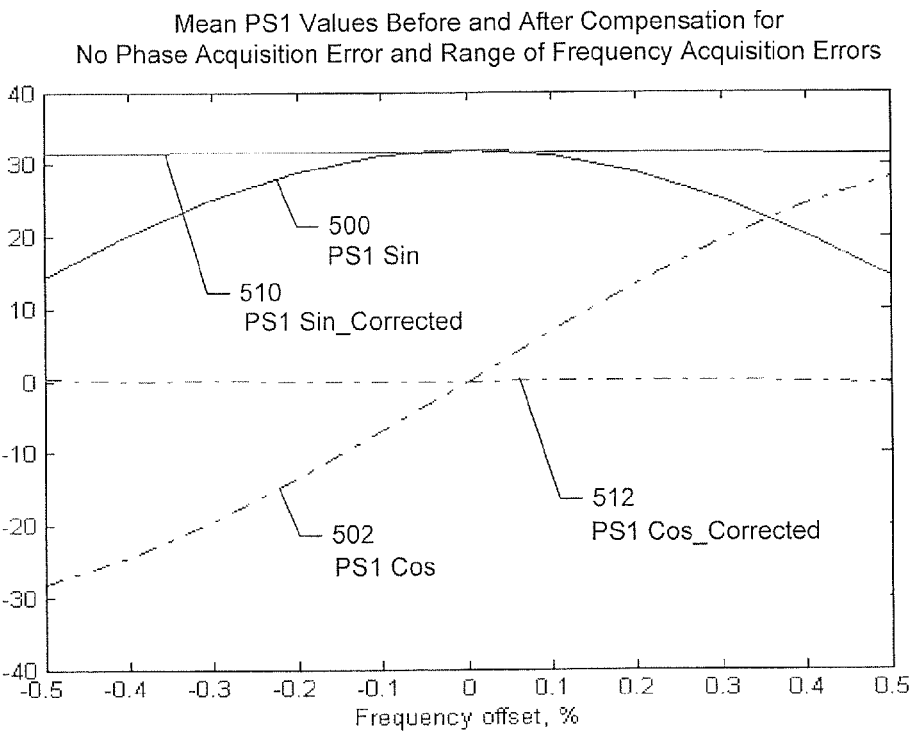
FIG. 5 illustrates graphs of mean sine and cosine values for a first servo burst pattern before and after correction for a range of frequency acquisition errors.

FIG. 5 illustrates graphs of the mean sine values 500 and the mean cosine values 502 for a first servo burst pattern in which the phase of the preamble pattern is acquired perfectly and before correction for a range of frequency acquisition errors for the preamble pattern. As shown, the sine and cosine values (graphs 500 and 502) are substantially distorted by increasing frequency offset values. FIG. 5 further illustrates graphs of the mean sine values 510 and the mean cosine values 512 that have been corrected through a transformation matrix as described above to compensate for detected values of the frequency acquisition error. As shown, the corrected sine values 510 and the corrected cosine values 512 remain substantially constant across the illustrated range of frequency offset values, thereby confirming that the various embodiments described herein can determine and compensate for frequency acquisition error of the preamble pattern.

Figure 6:
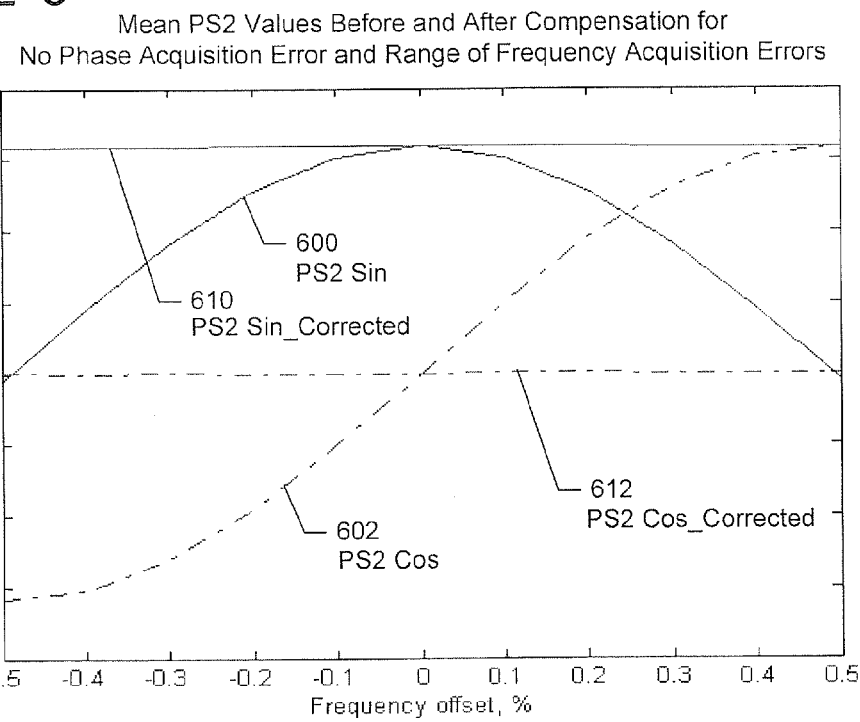
FIG. 6 illustrates graphs of mean sine and cosine values for a second servo burst pattern before and after correction for a range of frequency acquisition errors.

FIG. 6 illustrates graphs of the mean sine values 600 and the mean cosine values 602 for a second servo burst pattern in which the phase of the preamble pattern is acquired perfectly and before correction for a range of frequency acquisition errors for the preamble pattern. As shown, the sine and cosine values (graphs 600 and 602) are substantially distorted by increasing frequency offset values. FIG. 6 further illustrates graphs of the mean sine values 610 and the mean cosine values 612 that have been corrected through a transformation matrix as described above to compensate for detected values of the frequency acquisition error. As shown, the corrected sine values 610 and the corrected cosine values 612 remain substantially constant across the illustrated range of frequency offset values, thereby further confirming that the various embodiments described herein can determine and compensate for frequency acquisition error of the preamble pattern.

Figure 7:
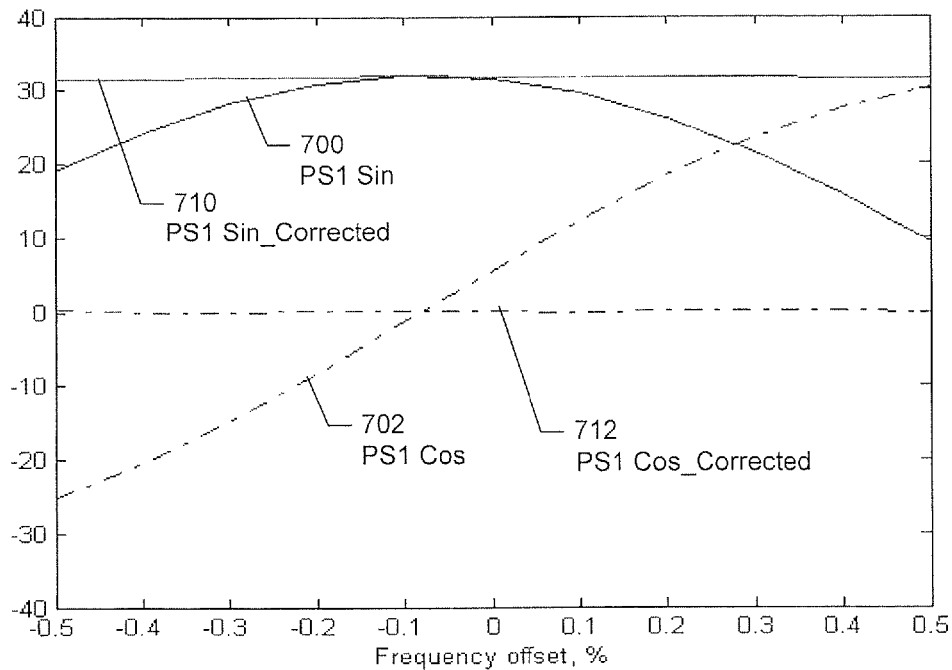
FIG. 7 illustrates graphs of mean sine and cosine values for a first servo burst pattern before and after correction for a 10° phase acquisition error and a range of frequency acquisition errors.

FIG. 7 illustrates graphs of the mean sine values 700 and the mean cosine values 702 for a first servo burst pattern before correction for a 10° phase acquisition error and a range of frequency acquisition errors for the preamble pattern. As shown, the sine and cosine values (graphs 700 and 702) contain a phase offset error due to the phase acquisition error and are substantially distorted by increasing frequency offset values. FIG. 7 further illustrates graphs of the mean sine values 710 and the mean cosine values 712 that have been corrected through a transformation matrix as described above to compensate for detected values of the phase acquisition error and the frequency acquisition error. As shown, the corrected sine values 710 and the corrected cosine values 712 remain substantially constant across the illustrated range of frequency offset values and for the phase acquisition error, thereby further confirming that the various embodiments described herein can determine and compensate for both phase and frequency acquisition error of the preamble pattern.

Figure 8:
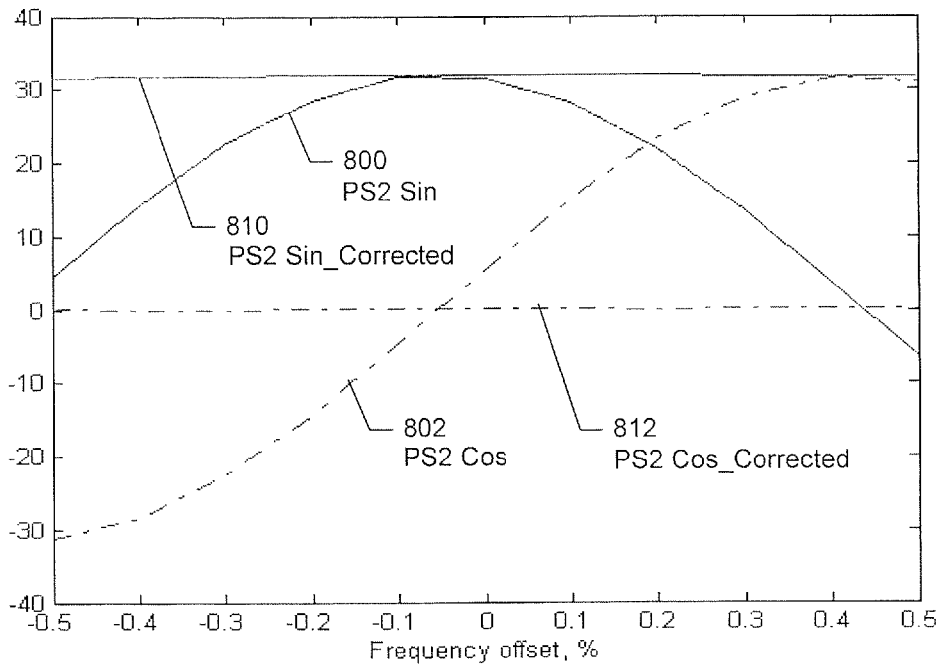
FIG. 8 illustrates graphs of mean sine and cosine values for a second servo burst pattern before and after correction for a 10° phase acquisition error and a range of frequency acquisition errors.

FIG. 8 illustrates graphs of the mean sine values 800 and the mean cosine values 802 for a second servo burst pattern before correction for a 10° phase acquisition error and a range of frequency acquisition errors for the preamble pattern. As shown, the sine and cosine values (graphs 800 and 802) contain a phase offset error due to the phase acquisition error and are substantially distorted by increasing frequency offset values. FIG. 8 further illustrates graphs of the mean sine values 810 and the mean cosine values 812 that have been corrected through a transformation matrix as described above to compensate for detected values of the phase acquisition error and the frequency acquisition error. As shown, the corrected sine values 810 and the corrected cosine values 812 remain substantially constant across the illustrated range of frequency offset values and for the phase acquisition error, thereby further confirming that the various embodiments described herein can determine and compensate for both phase and frequency acquisition error of the preamble pattern.

Although exemplary embodiments have been described that use at least two postamble patterns to determine the phase and frequency acquisition errors $\theta_i$ and $\Delta f$ in some other embodiments, the servo controller 52 can be configured to determine the phase acquisition error $\theta_i$ using the readback signal from the preamble pattern. For example, the PES computation module 326 may be configured to detect timing between the servo clock signal and the preamble pattern using a phase detection module.

The servo controller 52 can then use the determined phase acquisition error $\theta_i$ from the preamble and a phase angle between the servo clock signal and the readback signal from a single postamble pattern to determine the frequency acquisition error $\Delta f$ in the preamble. The frequency acquisition error $\Delta f$ may be determined based on a ratio of 1) a difference between the preamble phase angle and the postamble phase angle to 2) a number of cycles occurring in the readback signal from the preamble pattern and the postamble pattern. The phase acquisition error $\theta_i$ from the preamble may be determined based on a difference between a value of the preamble timing and a value of the determined frequency error multiplied by a number of cycles occurring in the readback signal from the preamble pattern and the postamble pattern.

Accordingly, when the servo controller 52 is configured to determine the phase acquisition error $\theta_i$ using the readback signal from the preamble pattern, the frequency acquisition error $\Delta f$ of the preamble can then be determined using a single postamble pattern, although more than one postamble pattern may be used and which may increase the accuracy of the determined preamble phase acquisition error $\theta_i$ and/or frequency acquisition error $\Delta f$.

Once $\theta_i$ and $\Delta f$ are determined, the phase errors corresponding to the burst fields can be determined using the exemplary equations describe above. Once the phase errors for each burst field are determined, the burst signal can be compensated as described above for compensation of a NULL pattern. For other servo burst patterns, the equations may be modified based on the teachings herein.

The particular equations in the above exemplary operations may change as a function of the radial location of the head, skew angle of the head, and/or other head to disk interface characteristics. Therefore, in some embodiment, a regression technique may be used to compute the equation coefficients at different radial locations across the disk and/or at different skew angles. The equation coefficients may be stored in a lookup table and/or a parametric equation for reference during operation of the disk drive.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A circuit comprising:
a timing circuit that detects a preamble phase angle between a clock signal and a preamble signal read from a preamble pattern on a moving storage media, that detects at least one postamble phase angle between the clock signal and a postamble signal read from a postamble pattern following the preamble pattern on the storage media, and that determines values for a phase acquisition error and a frequency acquisition error in the preamble phase angle in response to the postamble phase angle.

2. The circuit of claim 1, wherein:
the postamble pattern comprises first and second postamble patterns, and
the timing circuit detects a first postamble phase angle between the clock signal and the first postamble pattern, detects a second postamble phase angle between the clock signal and the second postamble pattern, and determines the phase acquisition error in the preamble phase angle in response to comparison of 1) a difference between the preamble phase angle and the first postamble phase angle to 2) a difference between the preamble phase angle and the second postamble phase angle.

3. The circuit of claim 2, wherein:
the timing circuit further determines the frequency acquisition error in the preamble phase angle in response to comparison of 1) a difference between the preamble phase angle and the first postamble phase angle to 2) a difference between the preamble phase angle and the second postamble phase angle.

4. The circuit of claim 2, wherein:
the timing circuit determines the frequency acquisition error in response to a ratio of 1) a difference between the first and second postamble phase angles and 2) a difference between numbers of cycles occurring in a readback signal from the first and second postamble patterns.

5. The circuit of claim 4, wherein:
the timing circuit determines the phase acquisition error in response to a difference between the first postamble phase angle and a value of the determined frequency acquisition error multiplied by a number of cycles occurring in the readback signal from a portion of the storage media including between the preamble pattern and the first postamble pattern.

6. The circuit of claim 1, wherein:
the timing circuit detects a preamble phase angle between the clock signal and the preamble signal, detects a postamble phase angle between the clock signal and the postamble signal, and determines values of the phase acquisition error and frequency acquisition error in response to the preamble phase angle and the postamble phase angle, and a number of cycles occurring in a readback signal from a portion of the storage media including between the preamble pattern and the postamble pattern.

7. The circuit of claim 6, wherein:
the timing circuit detects the preamble phase angle by detecting timing between the clock signal and a zero phase start burst in the preamble pattern.

8. The circuit of claim 6, wherein:
the timing circuit determines the frequency acquisition error in the preamble phase in response to a ratio of 1) a difference between the preamble phase angle and the postamble phase angle to 2) a number of cycles occurring in the readback signal from the preamble pattern and the postamble pattern.

9. The circuit of claim 8, wherein:
the timing circuit determines the phase acquisition error in response to a difference between a value of the preamble timing and a value of the determined frequency error multiplied by a number of cycles occurring in the readback signal from a portion of the storage media including between the preamble and postamble patterns.

10. The circuit of claim 1, wherein:
the timing circuit detects position phase angles between the clock signal and at least two position patterns located between the preamble pattern and the postamble pattern and that are read by a sensor, and determines a position of the sensor relative to the position patterns using the detected position phase angles and compensating for the determined phase and frequency acquisition errors.

11. The circuit of claim 10, wherein:
the timing circuit detects the position phase angles between the clock signal and at least two servo patterns located between the preamble pattern and the postamble pattern.

12. The circuit of claim 10, wherein:
the timing circuit determines position of the sensor by determining a first position pattern phase error that represents an effect of the determined phase and frequency acquisition errors on a first position phase angle between the clock signal and a first one of the sensor position patterns, by determining a second position pattern phase error that represents an effect of the determined phase and frequency acquisition errors on a second position phase angle between the clock signal and a second one of the position patterns, and by adjusting first and second ones of the position phase angles to compensate for respective ones of the determined first and second position pattern phase errors.

13. The circuit of claim 12, wherein:
the postamble pattern comprises first and second postamble patterns, and
the timing circuit determines the first position pattern phase error based on adding a value of the phase acquisition error to a value of the frequency acquisition error that is multiplied by a number of cycles occurring in a readback signal from the sensor reading a portion of the storage media including between the preamble pattern and the first postamble pattern, and determines the second position pattern phase error based on adding a value of the phase acquisition error to a value of the frequency acquisition error that is multiplied by a number of cycles occurring in the readback signal from a portion of the storage media including between the preamble signal and the second postamble pattern which follows the first postamble pattern.

14. The circuit of claim 13, wherein:
the timing circuit generates a first rotation matrix that includes a pair of cosine and sine values for the first position pattern phase error and a pair of sine and cosine value for the first position pattern phase error, and multiplies a pair of sine and cosine values for the position phase angle between the clock signal and the first sensor position pattern by the first rotation matrix to generate compensated first position values.

15. The circuit of claim 14, wherein:
the timing circuit generates a second rotation matrix that includes a pair of cosine and sine values for the second position pattern phase error and a pair of sine and cosine value for the second position pattern phase error, and multiplies a pair of sine and cosine values for the position phase angle between the clock signal and the second sensor position pattern by the second rotation matrix to generate compensated second position values.

16. The circuit of claim 15, further comprising:
a servo circuit that positions the sensor in response to the compensated first and second position values.

17. A method comprising:
detecting a preamble phase angle between a clock signal and a preamble signal read from a preamble pattern on a moving storage media;
detecting at least one postamble phase angle between the clock signal and a postamble signal read from a postamble pattern following the preamble pattern on the storage media; and
determining values for a phase acquisition error and a frequency acquisition error in the preamble phase angle in response to the postamble phase angle.

18. The method of claim 17, wherein the postamble pattern comprises first and second postamble patterns; and further comprising:
detecting via a timing circuit a first postamble phase angle between the clock signal and the first postamble pattern;
detecting via the timing circuit a second postamble phase angle between the clock signal and the second postamble pattern;
determining the frequency acquisition error in response to a ratio of 1) a difference between the first and second postamble phase angles and 2) a difference between numbers of cycles occurring in a readback signal from a sensor reading first and second postamble patterns; and
determining the phase acquisition error in response to a difference between the first postamble phase angle and a value of the determined frequency acquisition error multiplied by a number of cycles occurring in the readback signal from the sensor reading a portion of the storage media including between the preamble pattern and the first postamble pattern.

19. The method of claim 18, further comprising:
detecting position phase angles between the clock signal and at least two position patterns located between the preamble pattern and the postamble pattern and read by the sensor;
determining a first position phase acquisition error that represents an effect of the determined phase and frequency acquisition errors on a first position phase angle between the clock signal and a first one of the sensor position patterns;
determining a second position phase acquisition error that represents an effect of the determined phase and frequency acquisition errors on a second position phase angle between the clock signal and a second one of the position patterns;
adjusting first and second ones of the position phase angles to compensate for respective ones of the determined first and second position phase acquisition errors; and
controlling an actuator motor to position the sensor responsive to the adjusted first and second ones of the position phase angles.

20. A servo controller circuit comprising:
a timing circuit that detects a preamble phase angle between a clock signal and a preamble signal read by a sensor from a preamble pattern on a moving storage media, that detects a position phase angle between the clock signal and a position pattern located after the preamble pattern, and that detects at least one postamble phase angle between the clock signal and a postamble signal read from a postamble pattern following the position patterns on the storage media; and
a servo circuit that determines values for a phase acquisition error and a frequency acquisition error in the preamble phase angle in response to the postamble phase angle, determines a position phase acquisition error that represents an effect of the determined phase and frequency acquisition errors on a position phase angle between the clock signal and a the sensor position pattern, that adjusts the position phase angle to compensate for the determined position phase acquisition error, and that positions the sensor responsive to the adjusted position phase angles.

* * * * *